May 1, 1928.
W. L. MORRISON
STEERING WHEEL
Original Filed April 27, 1925
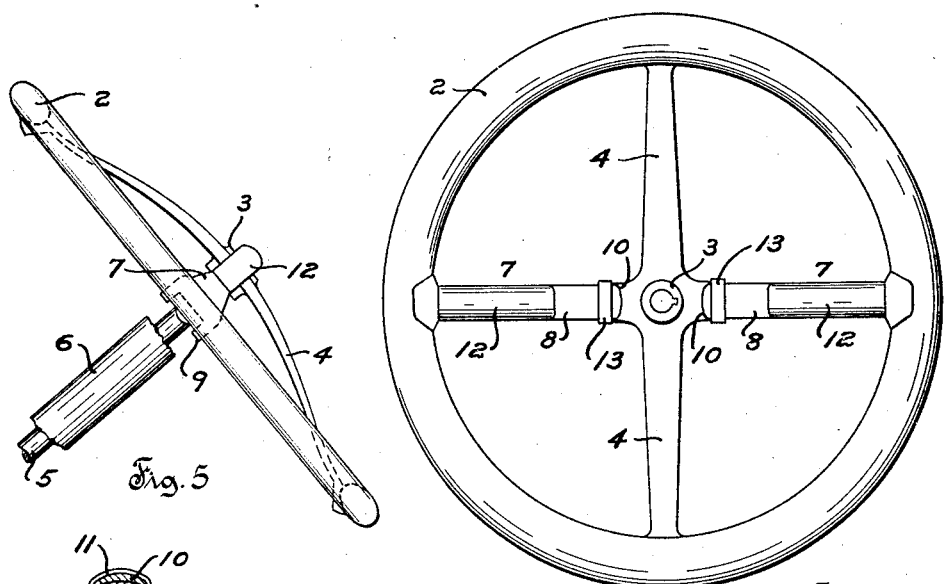
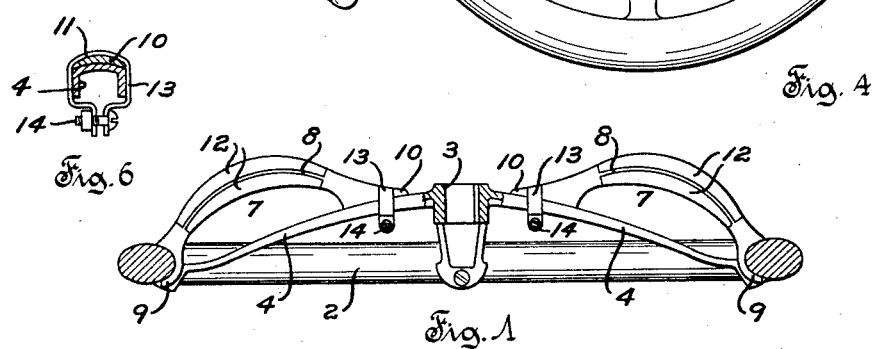
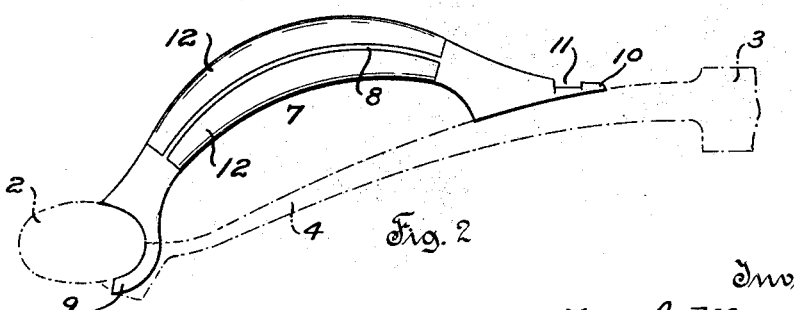
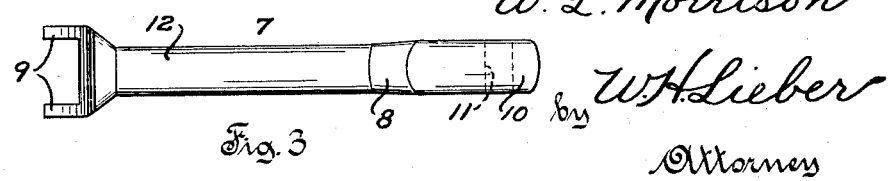
Inventor
W. L. Morrison
W H Lieber
by
Attorney Patented May 1, 1928.

1,667,942

UNITED STATES PATENT OFFICE.

WILLARD L. MORRISON, OF MELROSE, MASSACHUSETTS.

STEERING WHEEL.

Application filed April 27, 1925, Serial No. 26,052. Renewed March 2, 1928.

This invention relates in general to improvements in the construction of steering appliances for vehicles, and relates more specifically to an improved attachment for facilitating the use and for augmenting the utility of the steering wheels of automobiles and other conveyances employing similar steering devices.

An object of the invention is to provide an improved steering wheel which is simple in construction and which possesses maximum utility of operation.

The standard automobile steering wheel at present in universal use, comprises a non-corrosive annular gripping rim, and a metal spider consisting of a hub and a number of arms radiating from the hub and supporting the rim. While it is contemplated by the manufacturer of such steering wheels, that a driver should grip only the non-corrosive rim of the wheel, it is a well known fact that many individuals occasionally prefer to vary their grip and to utilize the rim supporting arms instead of the rim for gripping purposes. This is especially true of Ford drivers who find that because of the absence of a locked steering gear on Ford cars as distributed from the factory, they must maintain a constant grip on the wheels and it becomes extremely tiresome to constantly grip the wheel rim when long drives are taken. While the monotony may be relieved to some extent by occasionally utilizing the wheel arms for gripping purposes, the use of metal in the construction of these arms makes them unsuitable for this purpose. The surfaces of these arms rapidly corrode and they become mussy, and in cold weather the chilled metal does not present an attractive gripping medium. These arms are moreover not in a position to be conveniently gripped and are relatively small in cross-section as compared to the wheel rim, thus making the arms relatively undesirable for gripping purposes.

The present invention contemplates provision of one or more auxiliary gripping handles which may be utilized as alternatives for the wheel rim for steering purposes, these auxiliary handles being composed of suitable gripping material such as wood or hard rubber. While these auxiliary gripping handles are disclosed herein as being detachably associated with a standard steering wheel, they may of course be formed as a part of the wheel proper. The auxiliary gripping handles are preferably disposed radially of and within the main gripping rim, directly above the laterally extending arms of the wheel. In accordance with one feature of the invention, the auxiliary handles have their outer ends formed to snugly fit and to interlock with the adjacent rim portion, and have their inner ends detachably clamped to the adjacent arms near the wheel hub. The auxiliary handles are of attractive appearance and may be conveniently applied to a standard steering wheel and especially to the wheels of Ford cars. The improved device affords a relatively inexpensive and highly efficient alternative grip for a steering wheel and entirely avoids the objections to the use of the ordinary steering wheel cross-arms for gripping purposes. These and other objects and advantages of the present invention will be apparent from the following description.

A clear conception of an embodiment of the present improvement and of the mode of applying and of utilizing the same, may be had by referring to the drawing accompanying and forming a part of this specification in which like reference characters designate the same or similar parts, in the various views.

Fig. 1 is a central transverse cross-section through a standard steering wheel showing a pair of the improved auxiliary gripping handles applied to the diametrically opposite arms thereof.

Fig. 2 is an enlarged front elevation of one of the improved gripping handles.

Fig. 3 is an enlarged top view of one of the improved gripping handles.

Fig. 4 is a plan view of a standard steering wheel having a pair of the improved gripping handles applied thereto.

Fig. 5 is a side elevation of a standard steering wheel with the improved gripping handles applied thereto, showing also fragments of the steering rod and column.

Fig. 6 is an enlarged transverse section through one of the improved gripping handles and an adjacent steering wheel arm, showing the method of clamping the handle to the arm.

The standard automobile steering wheel specifically illustrated in the drawing, comprises in general an annular non-corrosive gripping rim 2 having oval transverse cross-section, and a metal spider consisting of a central hub 3 and a plurality of arms 4 radiating from the hub 3 and supporting the rim 2. The rim 2 is ordinarily formed of wood, hard rubber, or some other material having similar non-corrosive characteristics, while the spider is generally constructed of iron, an alloy thereof, or of aluminum. The central hub 3 of the wheel is formed for rigid attachment to the upper extremity of a steering rod 5 above a stationary steering column 6 as shown in Fig. 5, the steering wheel being inclined downwardly toward the driver who normally grips the opposite side portions of the rim 2.

The improved gripping handle 7 shown in detail in Figs. 3 and 4, comprises in general a metal frame 8 the medial portion 12 of which is substantially covered with wood, hard rubber, or some other material having non-corrosive characteristics. One end of the handle 7 is provided with a pair of curved projections 9 which are formed to hook under and to snugly fit the inner and lower surfaces of a steering wheel rim 2 on opposite sides of an arm 4, and to provide a positive interlock. The opposite end 10 of the handle 7 is formed to snugly fit the top of an arm 4 and has a transverse groove 11 extending across the top thereof. The handle 7 is constructed to present a neat appearance in conformity with the steering wheel itself, and to provide an attractive and comfortable gripping medium. Each steering wheel is preferably provided with a pair of the gripping handles 7 applied to diametrically opposite arms 4 thereof as shown in Figs. 1 and 4.

When applying the improved handle 7 to a standard steering wheel, the projections 9 at the end of the handle are slipped under the steering wheel rim 2 on opposite sides of the outer extremity of an arm 4 and are brought into engagement with the rim 2 as shown in Figs. 1 and 2. The opposite end of the handle 7 is then brought into engagement with the adjacent portion of the arm 4 after which a strap 13 is inserted within the recess 11 and is clamped into place by means of a bolt 14 as shown in Fig. 6. It will be obvious that the clamp 13 may be quickly applied and firmly locks the handle 7 in place against the rim 2 and the adjacent arm 4. It should also be apparent that the handle 7 may be just as readily removed as applied.

With a pair of handles 7 applied to a steering wheel as shown in Figs. 1 and 4, the driver may grip either the rim 2 or the handles 7, at will. If the driver becomes tired of manipulating the wheel by utilizing the rim 2, he can readily relieve the monotony by utilizing one or both of the handles 7 in lieu of the rim. Either of the gripping appliances may be utilized without interference by the other, and a gripping handle may obviously be applied to each of the arms 4 if desired.

By forming the gripping surfaces of the handles 7 of the same material as the rim 2 of the wheel, the attractive appearance of the wheel is augmented rather than diminished by application of the handles 7. While the handles 7 are shown herein as being applicable in the form of an accessory to a standard steering wheel, these handles may obviously be made an integral part of the wheel itself. The gripping handles 7 herein disclosed are especially applicable to Ford steering wheels but it should be understood that the invention is also applicable to the steering wheels of other types of automobiles as well as to the controlling wheels of other conveyances. The handles 7 while being relatively inexpensive are highly efficient alternative gripping appliances for a steering wheel and entirely avoid the objections to the use of the arms 4 for gripping purposes.

It should be understood that it is not desired to limit the invention to the exact details of construction herein shown and described, for various modifications within the scope of the claims may occur to persons skilled in the art.

It is claimed and desired to secure by Letters Patent:—

1. In combination, a steering wheel having a gripping rim and arms projecting inwardly from said rim, and an auxiliary handle associated with and extending along one of said arms.

2. In combination, a steering wheel having an annular gripping rim and arms radiating inwardly from said rim, and an auxiliary handle detachably associated with one of said arms and radiating inwardly from said rim.

3. In combination, a steering wheel having a gripping rim and arms radiating inwardly from said rim, and a pair of auxiliary handles associated with diametrically opposite arms adjacent to said rim, said handles being disposed above said arms and radiating inwardly from said rim.

4. In combination, a steering wheel having an annular gripping rim and arms radiating inwardly from said rim, and an auxiliary handle detachably associated with each of a pair of diametrically opposite arms closely adjacent to said rim, said handles being disposed above said arms and extending inwardly from said rim.

5. In combination, a steering wheel having a gripping rim and a pair of oppositely and laterally extending arms within said rim, and an auxiliary handle secured to each of said arms, said handles extending inwardly toward the center of said wheel.

6. In combination, a steering wheel having an annular gripping rim and a pair of diametrically opposite arms within said rim, and an auxiliary handle detachably secured to the upper portion of each of said arms adjacent to said rim, said handles extending inwardly from the rim of said wheel.

7. In combination, a steering wheel having an annular gripping rim and arms projecting inwardly from said rim, and an auxiliary handle having one end closely fitting the surface of said rim and having its opposite end secured to one of said arms remote from said rim.

8. In combination, a steering wheel having a rim and an arm projecting inwardly from said rim, and an auxiliary handle having one end formed with projections interlocking with said rim and having its opposite end rigidly attached to said arm.

9. In combination, a steering wheel having an annular rim and an arm projecting inwardly from said rim, and an auxiliary handle disposed longitudinally of and above said arm, said handle having one end formed with projections extending under said rim on opposite sides of said arm and having its opposite end detachably secured to said arm.

10. In combination, a steering wheel having an annular rim and arms projecting inwardly from diametrically opposite portions of said rim, and an auxiliary handle disposed above each of a complementary pair of said arms, each of said handles having an end closely fitting said rim and detachably interlocked therewith and having its opposite end detachably secured to said rim.

11. As an article of manufacture, an auxiliary gripping handle formed for attachment at its opposite ends to a steering wheel arm.

12. As an article of manufacture, an auxiliary gripping handle formed of non-corrosive material and adapted for attachment at its opposite ends to the cross arm of a steering wheel.

13. As an article of manufacture, an auxiliary gripping handle for steering wheels having a medial non-corrosive gripping portion and an end formed to interlock at its opposite ends with the steering wheel rim and an arm.

14. As an article of manufacture, an auxiliary gripping handle for steering wheels having a medial non-corrosive gripping portion, one end formed to interlock with the steering wheel rim, and the opposite end formed for detachable attachment to an arm of the steering wheel.

15. In combination with a steering wheel having a non-corrodible gripping rim and a corrodible arm projecting inwardly from said rim, of a non-corrodible auxiliary handle associated with said arm adjacent to said rim and extending along and above said arm.

16. In combination, a steering wheel having a gripping rim and an arm projecting inwardly from said rim, and an auxiliary handle disposed longitudinally of and having its opposite ends attached to said arm.

In testimony whereof, the signature of the inventor is affixed hereto.

WILLARD L. MORRISON.